CUTTER-HEAD STRUCTURE

Original Filed Aug. 16, 1967

United States Patent Office

Re. 27,654
Reissued June 5, 1973

27,654

CUTTER-HEAD STRUCTURE

Frederic F. Chapman, Coquitlam, British Columbia, and Daniel Hill, Kelowna, British Columbia, Canada, assignors to Ernest E. Runnion, Shelton, Wash.

Original No. 3,487,865, dated Jan. 6, 1970, Ser. No. 661,062, Aug. 16, 1967. Application for reissue May 17, 1971, Ser. No. 144,159

Int. Cl. B27g *13/00*

U.S. Cl. 144—229 16 Claims

Matter enclosed in heavy brackets [ ] appears in the original patent but forms no part of this reissue specification; matter printed in italics indicates the additions made by reissue.

ABSTRACT OF THE DISCLOSURE

A cutter head with a chipping tooth for taking slices of wood from a work piece, the slices separating into cards by horizontal shear, and incorporating a splitter which initiates on the cards as they are projected from the cutting tooth a vertical shear to insure that the cards will be divided into chips of a width most desirable for the digesting process of a high-grade pulping operation.

This invention relates to cutter heads for use in producing pulp chips. Rotary cutter heads designed for this purpose are customarily comprised of a plurality of head sections mounted in side-by-side relation upon a rotary arbor, with each head carrying at least one chipping tooth which in each revolution of the cutter head bites into a work piece and cuts a slice of wood therefrom. A highly desirable width for the chipping teeth is between two and three inches. The slice which comes off the work piece separates into what are commonly termed "cards" by the force of shearing fractures which take place along the grain in generally parallel planes more or less tangent to circles having the rotary axis of the cutter head as a center. This separation force is generally referred to as a horizontal shear in distinguishing the same from other shearing fractures, commonly known as vertical shear, which act along the grain of the cards in planes at right angles to the horizontal shear and cause the cards to break into two or more pieces of narnower width. An ideal chip is one having a width no narrower than ½" nor wider than 1½" but where natural vertical shear is relied upon it develops that a fair portion of the chips are either under-size or over-size. The present invention proposes as its principal object to provide a chip-cutting cutter head having in association with its chipping tooth a splitter functional to initiate in the cards as they are projected from the tooth, at a predetermined point in the width thereof, the vertical shear responsible for breaking the cards into chips.

With the above object in view and further aiming to provide an otherwise advanced cutter head, the invention consists in the novel construction and in the adaptation and combination of parts hereinafter described and claimed.

Description of invention

Figure 1:
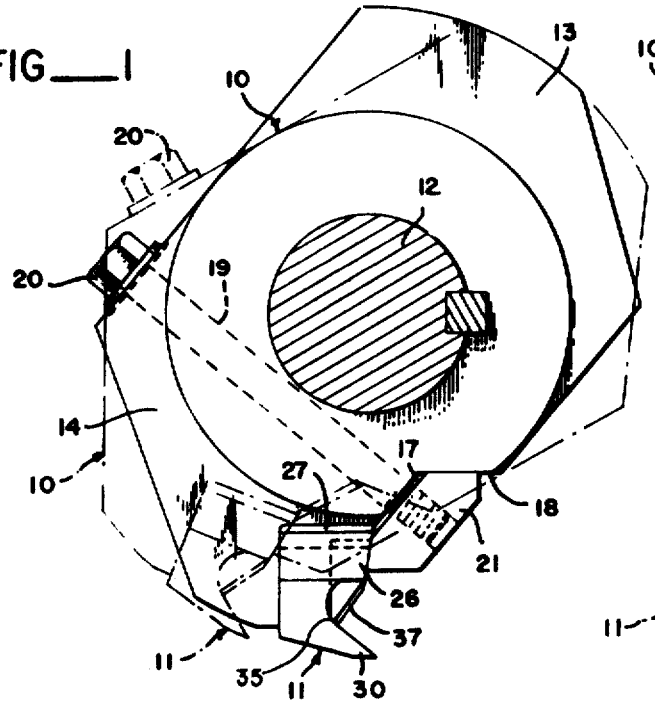
FIGURE 1 is a transverse vertical sectional view showing two of the plural head sections of a cutter head constructed to embody preferred teachings of the present invention, one of said two head sections being shown in full lines and the other in broken lines.
Figure 2:
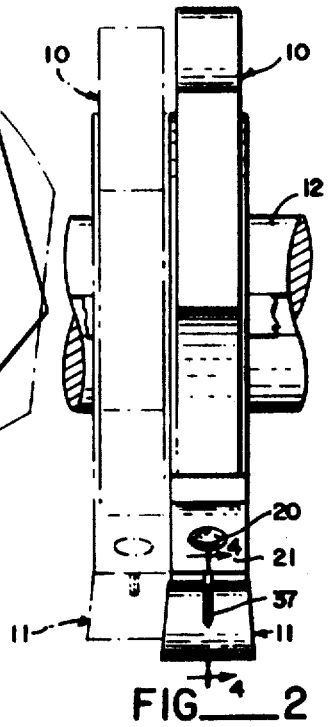
FIG. 2 is a fragmentary side elevational view thereof.
Figure 3:
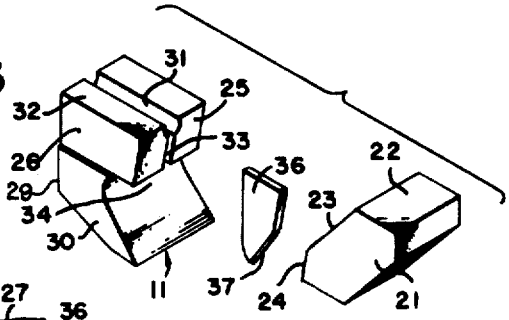
FIG. 3 is an exploded perspective view portraying a chipping tooth, splitter, and clamping block removed from the cutter head.
Figure 4:
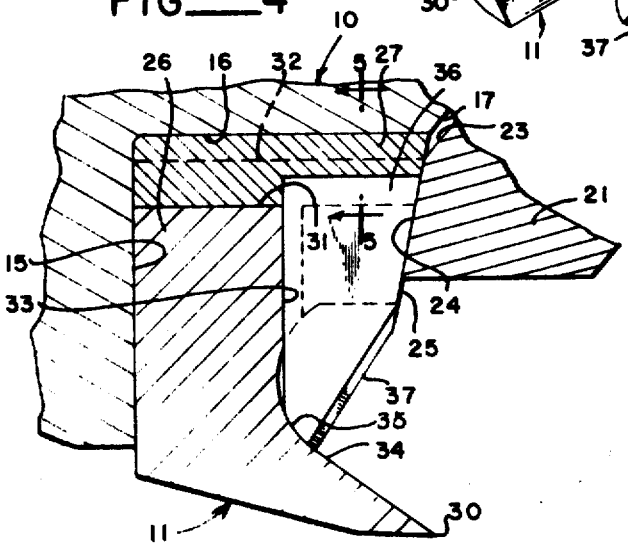
FIG. 4 is a fragmentary transverse vertical sectional view drawn to an enlarged scale on line 4—4 of FIG. 2.
Figure 5:
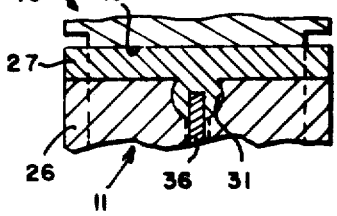
FIG. 5 is a fragmentary sectional view on line 5—5 of FIG. 4.

Cutter heads of the type to which the present invention is directed, intended for use in producing pulp chips, customarily have a set of several head sections with each section carrying a single chipping knife. The head sections are keyed or otherwise securely attached upon a power-driven rotary arbor, so as to lie in side-by-side relation with the several knives in the set located at equidistantly spaced intervals, say 22½°, of a circle having the rotary axis of the arbor as its center. Two of the head sections are shown in the drawing and denoted by the numeral 10. Knives carried thereby are designated by 11, and the rotary arbor by 12.

According to the present invention each head section has two radial arms which lie diametrically opposite one another, one arm 13 serving as a balancing arm and the other arm 14 presenting a socket for the mounting of the knife. The socket is open-sided and has an angular profile configuration to provide two planar walls 15 and 16 which respectively serve as a back wall and an inner end wall for the socket. The back wall is biased, say 20° or so, forwardly from a plane projected radial to the head through the juncture of the two walls. The inner end wall 16 extends forwardly from the back wall in a plane normal thereto.

Forwardly beyond the frontal limit of said end wall 16 the mounting arm is notched to provide two meeting flats 17 and 18. Flat 17 is located in obtuse angular relation, say 130°, to the end wall. Flat 18 desirably lies parallel to the end wall. A bolt-hole 19 is drilled through the mounting arm with its axis placed normal to the flat 17 and centered relative thereto. Accommodated by the bolt-hole is a cap-screw 20 which threads into a clamping block 21, drawing the block downwardly upon the hereinafter-described knife to secure the latter in the socket.

The knife-clamp 21 has the shape of an irregular right hexagonal prism, which is to say a figure with six rectangular faces. Only three of the faces, denoted by 22, 23 and 24, have functional significance. Face 22 fits against the flat 18. It bears to the face 23 the same angular relationship which exists between the flats 18 and 17. Face 24 is biased somewhat less than is the face 22 from the plane in which the intervening face 23 lies, say 30° as compared with 50°. The clamping block takes its purchase by the engagement of the face 22 against the flat 18. The clamping office is performed by the face 24, which lies in acute angular relation to the end wall of the socket and bears against a front face 25 presented by a root section 26 of the knife. The root section has a planar back face which seats upon the back wall 15 of the socket and an inner end face disposed normal thereto. The front face 25 lies in acute angular relation to the end face. A facing 27 of babbitt-metal overlies the end face and is adapted to seat against the end wall 16 of the socket. The root section has planar side faces disposed normal to the back face and the width corresponds to the width of the hubs 28 of the cutter-head sections. When a set of knife-carrying cutter-head sections are mounted upon the arbor, the arrangement is one in which the root sections of the knives have their leading edge moderately lapping the following edge of a preceding root section.

Said babbitt facing 27 compensates the knife to sharpening operations performed upon a forwardly hooked chipping tooth 30 which projects radially from the root section, serving to maintain a constant cutting radius and "angle of attack" throughout the usuable life of the knife. In the pouring of the babbitt-metal, the same is locked to the root section by flowing into a pocket 31 which is exposed to the inner end face 32 of the root section, extending the full length of such face on the median line thereof.

The root section presents in its upper portion a parallel-sided groove 33 exposed to the front face 25 and extending on the longitudinal median line of the root section from the babbitt pocket 31 to a throat 34 cut back rather deeply from the chipping tooth 30. *The front face 25 defines a plane intersecting the projecting extremity between the cutting edge 30 and the concave surface 35. The parallel walls defining the groove 33 or planar slot are formed in the metal body 29. The planar slot adjacent the throat 34 cooperates with the throat to define a blade-receiving space extending to the concave surface 35.* A hardened metal blade 36 fits in said groove with its inner end projecting into the pocket 31 so as to be invested by the poured babbitt. The outer end projects as a tongue into the throat and has its forwardly facing edge bevelled, as at 37. Such bevelled edge performs a splitting function upon wood cards cut by the tooth. The slope given to the bevelled surfaces is quite shallow in that it is not intended that the splitting tongue cut into the card. Rather, it is to initiate a line fracture upon an end edge of the cards as the cards are propelled from the tooth 30 into the throat 34. This insures that a bisecting vertical shear will occur, dividing each card into two chips. It will be understood that the cards are themselves a product of shearing stress, in this instance horizontal, as the successive slices cut by the knife from a work piece divide themselves into a plurality of cards.

The embodiments of the invention in which an exclusive property or privilege is claimed are defined as follows:

1. Means for producing pulp chips comprising a cutter head mounted for rotation on a power driven arbor, a chipper tooth having a cutting edge mounted on said cutter head, means for securing the chipper tooth to the cutter head so that the cutting edge of the chipper tooth extends beyond the periphery of the cutter head, the cutting edge of said cutting tooth being parallel to the axis of rotation of said cutter head, a chip splitting means carried by the cutter tooth at a right angle to said cutting edge for splitting a severed pulp chip into a plurality of chips and said chip splitting means positioned on said chipper tooth inwardly and rearwardly from the cutting edge and intermediate the sides of said cutting tooth.

2. Structure according to claim 1 in which the chipping knife has a root section which is clamped in a mating socket provided by the cutter head, the tooth projecting radially outwardly from the root section with its cutting edge overhanging a throat through which the chips are projected, the splitting means comprising a bevel-edged tongue which extends into the throat of the tooth from a base part of the chipping tooth.

3. Structure according to claim 2 having a means common to both the chipper tooth and the tongue performing a keeper function for the latter and the clamping function for the root section of the former.

4. Structure according to claim 2 in which the root section provides a groove in which the base part of the splitting means is fitted, the keeping of said base part in the groove and the clamping of the root section in its socket being performed by a block tensioned against the root section by a cap screw received through a bolt-hole which extends in offset relation to the rotary axis of the cutter head between two flats which are formed in the perimeter of the cutter head at opposite sides thereof.

5. For the production of pulp chips, a rotary cutter head providing a radial arm formed in its leading side with a socket which provides a back wall and an inner wall and has the flanking sides open, and forwardly beyond the inner wall presents a notch which is made angular to provide a back wall and an inner wall, a chipping tooth having a root section which seats in the socket and a tooth section which extends outwardly and forwardly from the root section, the root section providing front, back and inner faces, the back and inner faces respectively bearing against the back and inner walls of the socket and the front face converging in an outward direction toward the back face, a clamping block bearing by one face against the inner wall of the notch and by another face against the front face of said root section of the knife, the radial arm having a through bolt-hole extending back-to-front to said back wall of the notch from a flat formed upon the trailing side of the arm, and a cap screw received through the bolt-hole taking a head purchase upon said flat and threading into the clamping block for drawing the block against said front face of the chipping tooth's root section, a splitter carried by the chipping tooth to occupy an interruptive position in the path of a chip projected from the tooth and by said interruption performing a splitting influence to promote a chip, a vertical shear dividing a chip along the grain of the wood into at least two chips, the splitter comprising a blade fitting in a groove provided in the knife's root section on the median longitudinal vertical plane thereof.

*6. For the production of pulp chips using a rotary cutter head, a chipping knife comprising a metal body having a root section for mounting on the rotary cutter head and a hooked chipping tooth projecting outwardly from the root section, the hooked chipping tooth having a cutting edge formed on the projecting extremity thereof and a concavely curved throat at the juncture with root section, a central slot formed in said root section adjacent said throat and substantially perpendicular to said cutting edge, a chip splitting blade mounted in said slot and extending into said throat, said blade having a splitting edge facing and spaced a substantial distance from said cutting edge for splitting the severed pulp chips.*

*7. The chipping knife of claim 6 wherein the hooked chipping tooth is of a generally tapered cross-section thickening toward the root section.*

*8. The chipping knife of claim 6 wherein said root section has a pocket formed adjacent said slot, said splitter blade extends into said pocket, and babbitt metal filling said pocket for supporting and securing said blade.*

*9. The chipping knife of claim 6 wherein said splitting edge comprises shallowly bevelled surfaces facing in both lateral directions for fracturing the severed chip and urging the two resultant chips laterally for assisting in discharging the chips from the knife throat.*

*10. For use with a rotary cutter head and a chip splitting blade, the improvement comprising: a chipping knife for the production of pulp chips, said chipping knife having a metal body provided with a root section for detachable mounting on the rotary cutter head, the root section having a front face, a rear face, and an inner end face extending therebetween, said rear face and inner end face each being shaped for solid surface contact with the rotary cutter head, said metal body having a hooked chipping tooth projecting outwardly from said root section and hooking in the direction of rotation of the rotary cutter head, said hooked chipping tooth having a projecting extremity with a cutting edge facing the direction of rotation, said hooked chipping tooth also having a concave surface extending rearward of said front face and forming a throat facing the direction of rotation for discharging chips severed by said cutting edge, said front face defining a plane intersecting said projecting extremity between said cutting edge and said concave surface, and walls forming a planar slot in said body and said front face and cooperating with said throat to define a blade-receiving space, said slot being substantially perpendicular to said cutting edge to receive a blade for laterally splitting severed chips entering the throat.*

*11. The chipping knife of claim 10 wherein said root section has a pocket formed adjacent said slot for receiving and retaining babbitt metal to secured and support the splitting blade.*

*12 A chipping knife for mounting on a rotary cutter head, comprising, an integral metal body having a generally rectangular root section for mounting on the cutter*

*head and a hook-shaped chipping tooth of an irregular tapering cross-section extending outwardly from said root section, said chipping tooth tapering to a cutting edge at its outward extremity, said chipping tooth having an inner surface extending from said cutting edge to said root section and forming a curved throat into which the chips proceed upon severing by said cutting edge, and a centrally located splitter means positioned in said throat and having a splitting edge perpendicular to and spaced from said cutting edge to laterally divide a severed chip into two chips.*

*13. A chipping knife for mounting on a rotary cutter head, comprising, a root section for mounting the knife on the cutter head and chipping tooth projecting outwardly from said root section, said chipping tooth having a cutoing edge at its outward extremity, and a splitter means having a splitting edge generally perpendicular to and spaced rearwardly from said cutting edge to laterally fracture a severed chip into two chips.*

*14. The chipping knife of claim 13 wherein said splitting means comprises a separate flat blade having said splitting edge.*

*15. The chipping knife of claim 13 wherein said splitting edge is spaced a sufficient distance from said cutting edge for the chip to have been substantially completely severed from the wood by the cutting edge for the splitting edge to readily fracture the severed chip.*

*16. The chipping knife of claim 15 wherein said chipping tooth has a surface between said cutting edge and splitting edge for engaging the cut surface of the chips and wedging the severed chips toward the splitting edge.*

References Cited

The following references, cited by the Examiner, are of record in the patented file of this patent or the original patent.

UNITED STATES PATENTS

| | | | |
|---|---|---|---|
| 3,017,912 | 1/1962 | Sybertz | 144—326 A |
| 709,526 | 9/1902 | Taylor | 144—230 |
| 2,449,605 | 9/1948 | Kelton | 144—230 |
| 2,784,753 | 3/1957 | Kleim et al. | 144—172 X |
| 2,899,992 | 8/1959 | Key | 144—218 X |
| 3,237,275 | 3/1966 | Middleton | 144—229 X |

FOREIGN PATENTS

| | | | |
|---|---|---|---|
| 254,871 | 1/1949 | Switzerland | 144—230 |

GIL WEIDENFELD, Primary Examiner

U.S. Cl. X.R.

144—162, 237; 29—105